(12) United States Patent
Fabre et al.

(10) Patent No.: US 12,122,069 B2
(45) Date of Patent: Oct. 22, 2024

(54) METHOD FOR IMPREGNATING A FIBROUS PREFORM USING A SEAL, AND A METHOD FOR MANUFACTURING A MATRIX REINFORCED BY A FIBROUS PREFORM

(71) Applicant: Safran Aircraft Engines, Paris (FR)

(72) Inventors: Hubert Jean Marie Fabre, Moissy-cramayel (FR); Nicolas Cambyse Ashtari, Moissy-cramayel (FR); Raoul Jaussaud, Moissy-cramayel (FR); Marc-Emmanuel Jean François Techer, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 702 days.

(21) Appl. No.: 16/317,270

(22) PCT Filed: Jul. 13, 2017

(86) PCT No.: PCT/FR2017/051924
§ 371 (c)(1),
(2) Date: Jan. 11, 2019

(87) PCT Pub. No.: WO2018/011526
PCT Pub. Date: Jan. 18, 2018

(65) Prior Publication Data
US 2019/0232530 A1    Aug. 1, 2019

(30) Foreign Application Priority Data

Jul. 13, 2016   (FR) ...................................... 1656714

(51) Int. Cl.
*B29C 70/48*     (2006.01)
*B29C 33/00*    (2006.01)
*B29C 70/54*    (2006.01)

(52) U.S. Cl.
CPC .......... *B29C 33/0038* (2013.01); *B29C 70/48* (2013.01); *B29C 70/545* (2013.01); *B29C 70/546* (2013.01)

(58) Field of Classification Search
CPC ... B29C 70/546; B29C 33/50; B29C 43/3607; B29C 2043/3652; B29C 2043/3655
See application file for complete search history.

(56) References Cited

U.S. PATENT DOCUMENTS 3,733,159 A * 5/1973 Coffman ............... B30B 15/024
425/405.2
3,975,131 A * 8/1976 Bergounhon ........... B28B 7/243
425/405.2

(Continued)

FOREIGN PATENT DOCUMENTS

DE   10 2012 110 353 A1   4/2014
EP       0 785 062 A2     7/1997

(Continued)

OTHER PUBLICATIONS

Sheikh-Ahmad, Jamal, Machining of Polymer Composites, Springer, (2009), Chapter 2, pp. 37-62. (Year: 2009).*

(Continued)

*Primary Examiner* — Matthew J Daniels
(74) *Attorney, Agent, or Firm* — Bookoff McAndrews, PLLC

(57) ABSTRACT

A method for impregnating a fibrous preform by injection or infusion, the method including the steps of providing a mold having at least two portions, said mold presenting an inlet orifice and a vent orifice placed on opposite sides of the mold; placing a fibrous preform in a portion of the mold; placing a seal in a passage formed between an inside wall of the mold and the fibrous preform, said passage extending substantially along the direction extending between the opposite sides of the mold; closing the mold so that the two (Continued)

portions of the mold co-operate with the seal in such a manner as to shut off said passage; and impregnating the fibrous preform with an impregnation material.

5 Claims, 3 Drawing Sheets

(56) References Cited

U.S. PATENT DOCUMENTS

| | | | | |
|---|---|---|---|---|
| 5,134,002 | A * | 7/1992 | Vallier | B29C 70/443 |
| | | | | 428/36.1 |
| 5,151,277 | A * | 9/1992 | Bernardon | B29C 70/443 |
| | | | | 249/161 |
| 5,200,257 | A | 4/1993 | Gatarz et al. | |
| 5,484,642 | A * | 1/1996 | Bompard | B29C 70/48 |
| | | | | 442/337 |
| 9,162,397 | B2 * | 10/2015 | Katahira | B29C 70/865 |
| 2002/0145218 | A1 * | 10/2002 | Caldwell, Jr. | B29C 70/48 |
| | | | | 425/389 |
| 2005/0184413 | A1 * | 8/2005 | Forest | B29C 70/548 |
| | | | | 264/29.1 |
| 2006/0022383 | A1 * | 2/2006 | Ullman | B29C 33/76 |
| | | | | 264/313 |
| 2008/0136060 | A1 * | 6/2008 | Shpik | B29C 70/443 |
| | | | | 264/319 |
| 2012/0073042 | A1 * | 3/2012 | Galinier | B29C 45/1671 |
| | | | | 4/619 |
| 2015/0343717 | A1 * | 12/2015 | Graf | B29C 33/0038 |
| | | | | 425/500 |
| 2016/0059500 | A1 * | 3/2016 | Hosokawa | B29C 70/44 |
| | | | | 264/257 |
| 2018/0290403 | A1 * | 10/2018 | Hasan | B29D 22/00 |
| 2020/0376782 | A1 * | 12/2020 | Uehara | D06M 10/001 |

FOREIGN PATENT DOCUMENTS

| | | | |
|---|---|---|---|
| EP | 2 524 796 | A1 | 11/2012 |
| EP | 10 2013 215 041 | A1 | 3/2014 |
| FR | 2 890 591 | A1 | 3/2007 |
| WO | 00/06360 | A1 | 2/2000 |
| WO | WO-2014192601 | A1 * | 12/2014 ......... B29D 99/0007 |

OTHER PUBLICATIONS

International Search Report mailed Oct. 9, 2017 in International Application No. PCT/FR2017/051924 (7 pages).

* cited by examiner

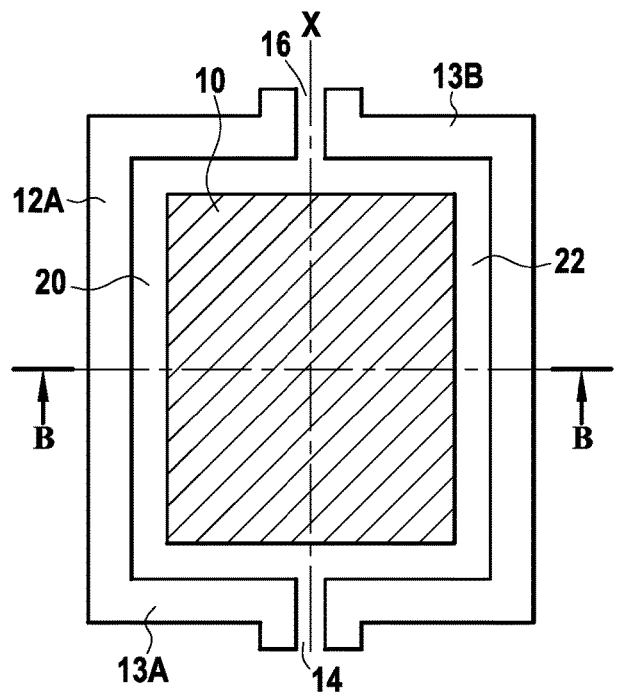
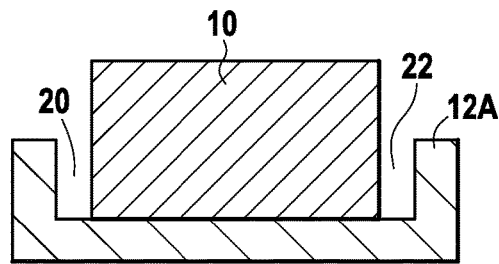
FIG.1A
FIG.1B
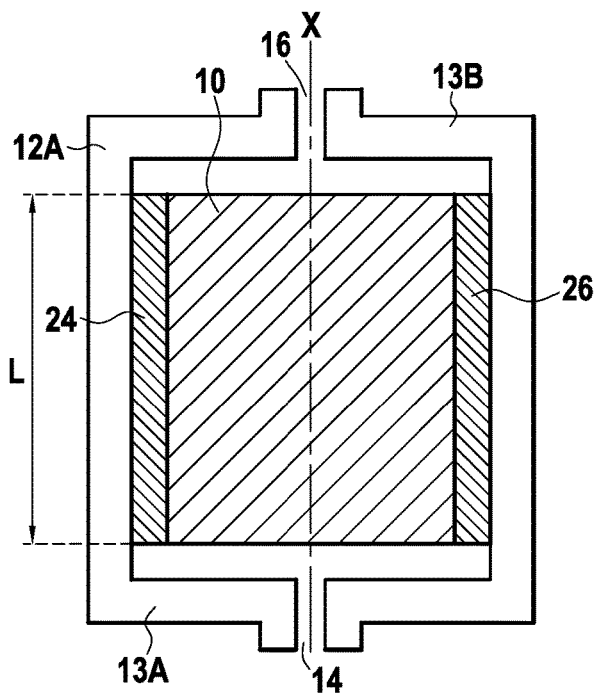
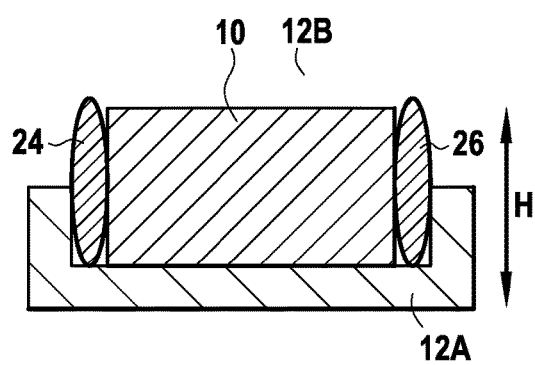
FIG.2A
FIG.2B

METHOD FOR IMPREGNATING A FIBROUS PREFORM USING A SEAL, AND A METHOD FOR MANUFACTURING A MATRIX REINFORCED BY A FIBROUS PREFORM

CROSS-REFERENCE TO RELATED APPLICATIONS

This application is the U.S. national phase entry under 35 U.S.C. § 371 of International Application No. PCT/FR2017/051924, filed on Jul. 13, 2017, which claims priority to French Patent Application No. 1656714, filed on Jul. 13, 2016.

FIELD OF THE INVENTION

The invention relates to a method for impregnating a fibrous preform by injection or by infusion, and also to a method for fabricating a matrix reinforced by a fibrous preform.

BACKGROUND

Impregnating a fibrous preform by infusion or injection, e.g. by injecting resin, known as resin transfer molding (RTM) injection, generally consists in placing a fibrous preform in a mold, then closing the mold, and introducing an impregnation material into the mold that contains the fibrous preform.

Nevertheless, it can happen that fibers of the fibrous preform become caught between two mold portions, thereby preventing the mold from being closed in sealed manner, so the mold leaks during impregnation.

In order to avoid catching fibers in that way, there exist molds in which the mold portions present anti-catching chamfers that, once the mold is closed, form cavities that are configured to receive the fibers that might impede proper closure of the mold. Another solution consists in using a mold that is significantly larger than the preform, such that the edges of the preform inside the mold are far enough away from the edges of the mold to ensure that no fibers can become caught between two mold portions. Nevertheless, those chamfers or that placing of the preform at a distance from the edges of the mold leads to channels being formed that bypass the preform during impregnation and that can lead to impregnation being of poor quality, thereby having a negative impact on the mechanical performance of the part that is finally fabricated. Specifically, to ensure that impregnation is of good quality, it is necessary for it to be uniform within the fibrous preform and in particular, during injection or infusion, it is necessary to ensure that the impregnation material forms a plane as it progresses, which plane moves regularly from the side of the mold presenting the orifice for introducing the impregnation material towards the side of the mold presenting the vent orifice. Under such ideal circumstances, the impregnation front is said to be plane, whereas in the presence of bypass channels, the impregnation front is said to present more of a U-shape. There thus exists a need in this sense.

SUMMARY OF THE INVENTION

An embodiment of the invention provides a method for impregnating a fibrous preform by injection or infusion, the method comprising the steps of:

- providing a mold having at least two portions, said mold presenting at least one inlet orifice and at least one vent orifice placed on opposite sides of the mold;
- placing a fibrous preform in a portion of the mold;
- placing at least one seal in at least one passage formed between an inside wall of the mold and the fibrous preform, said passage extending substantially along the direction extending between the opposite sides of the mold and respectively presenting the inlet orifice and the vent orifice;
- closing the mold so that the two portions of the mold co-operate with the seal in such a manner as to shut off said passage; and
- impregnating the fibrous preform with an impregnation material.

Likewise, below, and unless specified to the contrary, the term "preform" should be understood as "fibrous preform".

It can be understood that the mold presents two opposite sides, one side presenting at least one inlet orifice for introducing the infusion material, while the opposite side presents at least one vent orifice for evacuating air and/or surplus infusion material. It can thus be understood that these two sides are opposite along an axial direction, the axial direction extending from one of these two opposite sides towards the other of these two opposite sides. It can also be understood that the axial direction corresponds to the direction in which the impregnation front advances within the mold.

At least one seal is placed solely in passages that are substantially parallel to the axial direction. The term "substantially parallel" should be understood as forming an angle lying in the range 0° to 45° with the axial direction. Naturally, the direction of a passage is considered overall. Thus, a passage may be considered as being substantially parallel to the axial direction even though it locally presents portions that form an angle of more than 45° with the axial direction. Naturally, for each passage fitted with a seal, it is possible to have one or more seals.

Naturally, within the mold, it is possible to have passages that do not extend substantially parallel to the axial direction, but for example extend in a direction that is transverse to the axial direction. Such passages are not filled in by the seal. On the contrary, such passages should not be shut off since, immediately downstream from the inlet orifice and immediately upstream from the fibrous preform, or else immediately downstream from the fibrous preform and immediately upstream from the vent orifice (where "upstream" and "downstream" are considered in the flow direction of the impregnation material), these passages can form manifolds for the impregnation material upstream or downstream from the fibrous preform, thereby enabling impregnation to be made uniform and enhancing the formation of an impregnation front that is plane (i.e. substantially perpendicular to the axial direction)

By way of example, the seal is made of elastomer material. By way of example, the seal is made of silicon or fluorocarbon rubber (or FKM, also known under the trade name VITON®). In general, it should be understood that the seal is deformable, e.g. elastically-deformable, so as to be able to adapt to the shape of the passage and fill in said passage when the seal co-operates with the adjacent walls of the mold while the mold is being closed.

By way of example, the impregnation material may be an organic material (e.g. a thermosetting or thermoplastic resin), a ceramic, or indeed a metal.

By means of the seal, the passage(s) (i.e. the bypass channels) extending in the axial direction is/are filled in.

Thus, potential for the impregnation material to bypass the fibrous preform during impregnation is eliminated or at least significantly reduced. The impregnation material is thus forced to flow within the fibrous preform, thereby ensuring impregnation that is uniform and an impregnation front that is substantially plane.

In some embodiments, at least one seal is placed in all of the passages that extend between the opposite sides of the mold that respectively present the inlet orifice and the vent orifice.

This ensures that the impregnation material has strictly no possibility of bypassing the fibrous preform during impregnation via a passage that extends substantially parallel to the axial direction.

In some embodiments, the thermo-expandable seal is placed so that it extends in the mold over substantially the entire length of the fibrous preform between said opposite sides of the mold.

It can thus be understood that the seal extends in the passage over substantially the entire axial length of the fibrous preform. The term "substantially the entire length" should be understood as covering a distance lying in the range 60% to 105% of the length of the fibrous preform.

This makes it possible to avoid the impregnation material that is introduced into the fibrous preform subsequently flowing into a portion of the passage that was not filled in by the seal, which would otherwise disturb the progress of the impregnation front and consequently disturb the uniformity of impregnation.

In some embodiments, the seal presents a cross-section of circular or equivalent shape (when the seal is not deformed).

The term "circular or equivalent" is used to cover any shape of section that is circular, oval, elliptical, oblong, etc. Such a seal is particularly easy to use, presents known and perfectly controlled deformation under crushing, and has a low production cost.

In some embodiments, the seal presents an L-shaped cross-section.

It should therefore be understood that one "branch" of the L-shape of the seal is placed in the passage. The fibrous preform is housed in the inside corner of the L-shape. By way of example, the seal co-operates with a sacrificial portion of the fibrous preform. Thus, the portion of the raw matrix that is obtained at the end of the impregnation method and that corresponds to the portion of the preform cooperating with the seal is removed by machining together with the sacrificial portion, and this has no functional impact on the part that is obtained from the final matrix (i.e. the machined raw matrix). Such a seal shape makes it possible to improve sealing while protecting the fibrous preform from potential risks of the fibers buckling.

In some embodiments, the seal presents a U-shaped cross-section.

In some embodiments, an edge of the fibrous preform is engaged in the cavity of the U-shape of the seal.

By way of example, an edge of the fibrous preform is engaged in the cavity of the U-shape before the preform, and therefore the seal, is placed in the mold (or in a portion of the mold). Such an order particularly facilitates implementing the method. However, an edge of the fibrous preform may naturally be engaged in the cavity of the U-shape after the preform has been placed in the mold (or in a portion of the mold). By way of example, the seal may co-operate with a sacrificial portion of the fibrous preform. Thus, the portion of the raw matrix that is obtained at the end of the impregnation method that corresponds to the portion of the preform cooperating with the seal is removed by machining together with the sacrificial portion, and this has no functional impact on the part that is obtained from the final matrix (i.e. the machined raw matrix).

In some embodiments, the impregnation material is a resin.

Such an impregnation method using a seal is particularly well adapted to impregnating a fibrous preform with a resin. In particular, the seal is particularly compatible with resin, whereby unmolding is particularly easy.

An embodiment also provides a method for fabricating a matrix reinforced by a fibrous preform, the method comprising the steps of:

impregnating a fibrous preform in accordance with the method according to embodiments described in the present disclosure for impregnating a fibrous preform, thereby obtaining a reinforced raw matrix; and machining at least a portion of the reinforced raw matrix that was in contact with the seal during impregnation.

The term "machining" is used to cover any operation consisting in removing material by means of a machine tool, e.g. cutting, drilling, planing, sanding, piercing, milling, etc.

It can thus be understood that the portion of the raw matrix that corresponds to the portion of impregnation material that has solidified in contact with the seal is machined, in particular in order to eliminate imperfections that result from the presence of the seal.

BRIEF DESCRIPTION OF THE DRAWINGS

The invention and its advantages can be better understood on reading the following detailed description of various embodiments of the invention given as non-limiting examples. The description refers to the sheets of the accompanying figures, in which:

FIGS. 1A and 1B show a first step in an impregnation method in which a fibrous preform is placed in a portion of a mold;

FIGS. 2A and 2B show a second step of the impregnation method in which a seal is placed between the preform and a wall of the mold;

DETAILED DESCRIPTION OF EMBODIMENTS

Figure 3A:
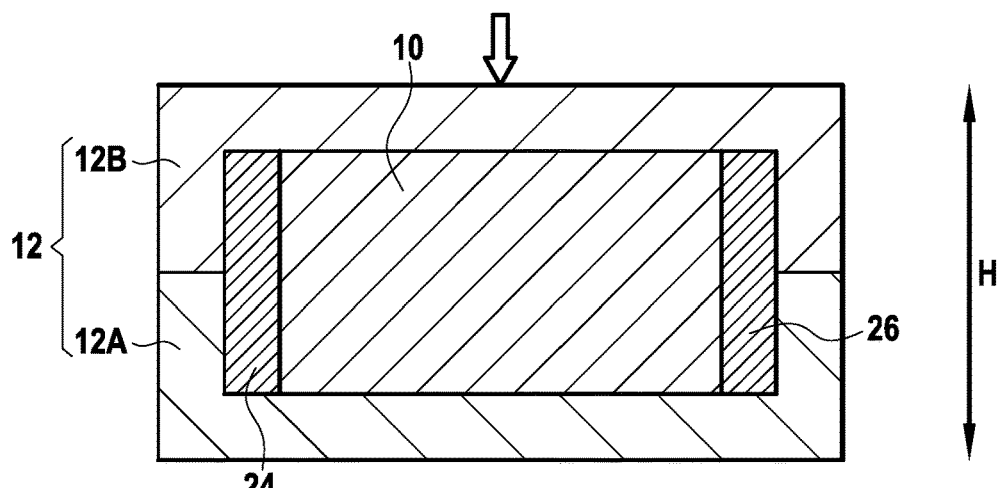
FIG. 3A shows a third step in which the mold is closed.

The figures show a mold, a seal, and a fibrous preform in highly diagrammatic manner in order to clarify the present disclosure. The person skilled in the art will naturally have no difficulty in transposing the teaching of the present disclosure to shapes that are appropriate for fabricating real parts of shapes that are more complex.

The impregnation method is described below with reference to FIGS. 1A to 4. It should be observed that FIGS. 1B and 2B are respectively views of FIGS. 1A and 2A on section plane B as shown in FIG. 1A.

FIGS. 1A and 1B show a first step during which a fibrous preform 10 is placed within a portion 12A of a mold 12. The mold 12 has an inlet orifice 14 for introducing an impregnation material into the mold. The mold 12 also has a vent orifice 16 for evacuating air and/or surplus impregnation material during impregnation.

The inlet orifice 14 and the vent orifice 16 are placed on two opposite sides 13A and 13B of the mold 12. These sides are opposite along an axial direction X. In this example, the mold 12 is of rectangular shape and the axial direction extends parallel to the long side of the rectangular shape. Naturally, the orifices could be placed on the short sides of the rectangular shape, and the axial direction would then extend parallel to the short sides of the rectangular shape. More generally, the axial direction is the direction that extends between any pair of opposite sides, these sides presenting respectively the inlet orifice and the vent orifice.

Passages 20 and 22, formed between the preform 10 and the inside walls of the mold 12, extend in the direction that extends between the opposite walls 13A and 13B. In other words, the passages 20 and 22 extend between the preform 10 and the mold 12 in a direction that is substantially parallel to the axial direction X. In this example, the passages 20 and 22 are parallel to the axial direction X.

A second step of the impregnation method is shown in FIGS. 2A and 2B. During this second step, seals 24 and 26 are placed respectively in the passages 20 and 22. In this example, the seals 24 and 26 are placed in such a manner as to extend over substantially the entire length of the preform 10 as considered between the opposite sides 13A and 13B of the mold 12 (i.e. the axial length of the preform). In this example, the seals 24 and 26 extend over 100% of the length L of the preform 10.

Naturally, it can be understood that the first step and the second step could be performed in the opposite order: specifically, it is possible to place the preform 10 in a portion of the mold 12 before putting the seal(s) 24 or 26 into place, or vice versa. Or indeed, it is possible to place at least one seal in a portion of the mold, then to put the preform into place, and then put at least one other seal into place.

It should be observed that the seals 24 and 26 have sections of circular or equivalent shape, and more particularly in this example of oval shape. In this example, the height of the seals in the height direction Y, perpendicular to the axial direction X, which extends in the opening/closing direction of the mold 12, is greater than the height of the portion of the preform 10 that is adjacent to the seal 24, 26 in the same direction Y. Thus, while the mold 12 is being closed, the second portion 12B of the mold co-operates with the seals 24 and 26, whereby the seals deform in such a manner as to fill in the passages 20 and 22, respectively. This step of closing and shutting off the passages by means of the seals deforming is shown in FIG. 3A. The arrow (bold line) shows the direction of approach of the second portion 12B of the mold relative to the first portion 12A, while the mold 12 is being closed. In general, it should be understood that the height of the seals is greater than the height of the mold cavity, but not necessarily greater than the height of the preform.

Figure 3B:
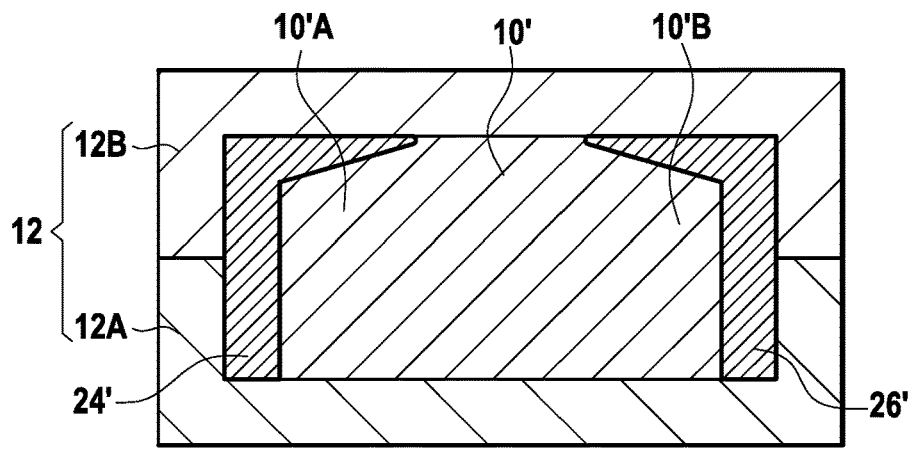
FIGS. 3B and 3C show variant seal shapes.

FIG. 3B shows a first variant in which the seals present an L-shaped cross-section. In this example, the preform 10' presents sacrificial portions 10'A and 10'B, each of which is received in the inside corner of the L-shape of a respective one of the seals 24' and 26'. It should be observed that the branch of the L-shape of each of the seals 24' and 26' that is not placed in a passage 20, 22, presents in cross-section, a beveled shape of thickness that decreases on moving away from the corner of the L-shape. This enables co-operation with the preform 10' to be progressive and avoids generating unacceptable forces and deformation in the preform 10'. This also makes it possible to avoid potentially forming localized paths between the seal and the fibrous preform.

Figure 3C:
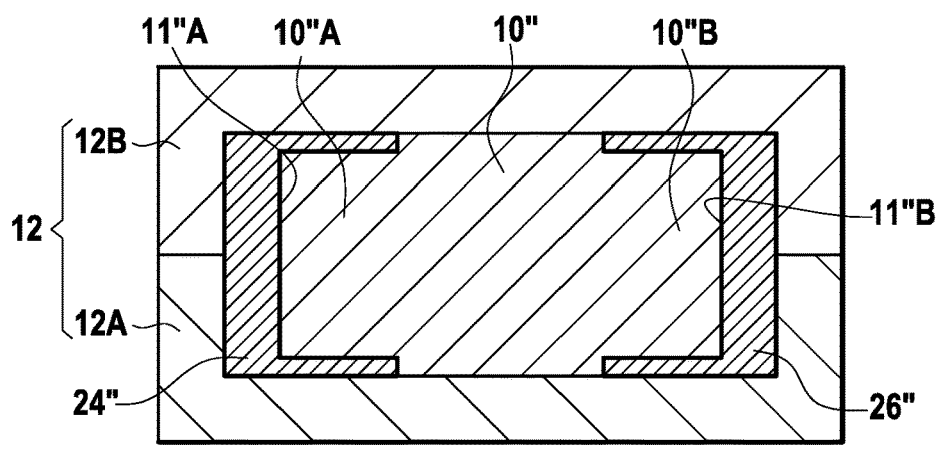

FIG. 3C shows a second variant in which the seals present a U-shaped cross-section. In this example, the preform 10" presents sacrificial portions 10"A and 10"B each of which is received in the U-shaped cavity of a respective one of the seals 24" and 26". In this example, the sacrificial portions 10"A and 10"B of the preform 10" present shoulders configured to co-operate with the vertical branches of the U-shapes of the seals. Thus, the seals 24" and 26" are assembled together with the preform 10" by engaging the edges 11"A and 11"B in the cavities of the U-shapes of the seals.

However, as with the L-shaped seal, these vertical branches of the U-shape may naturally present, in cross-section, a beveled shape of thickness that decreases on moving away from the horizontal bottom branch of the U-shape. Conversely, in yet another variant, the branch of the L-shaped section of the seal shown in FIG. 3B and that is not placed in a passage 20, 22, may present a shape that is rectangular and may co-operate with a shoulder of the preform.

Figure 4:
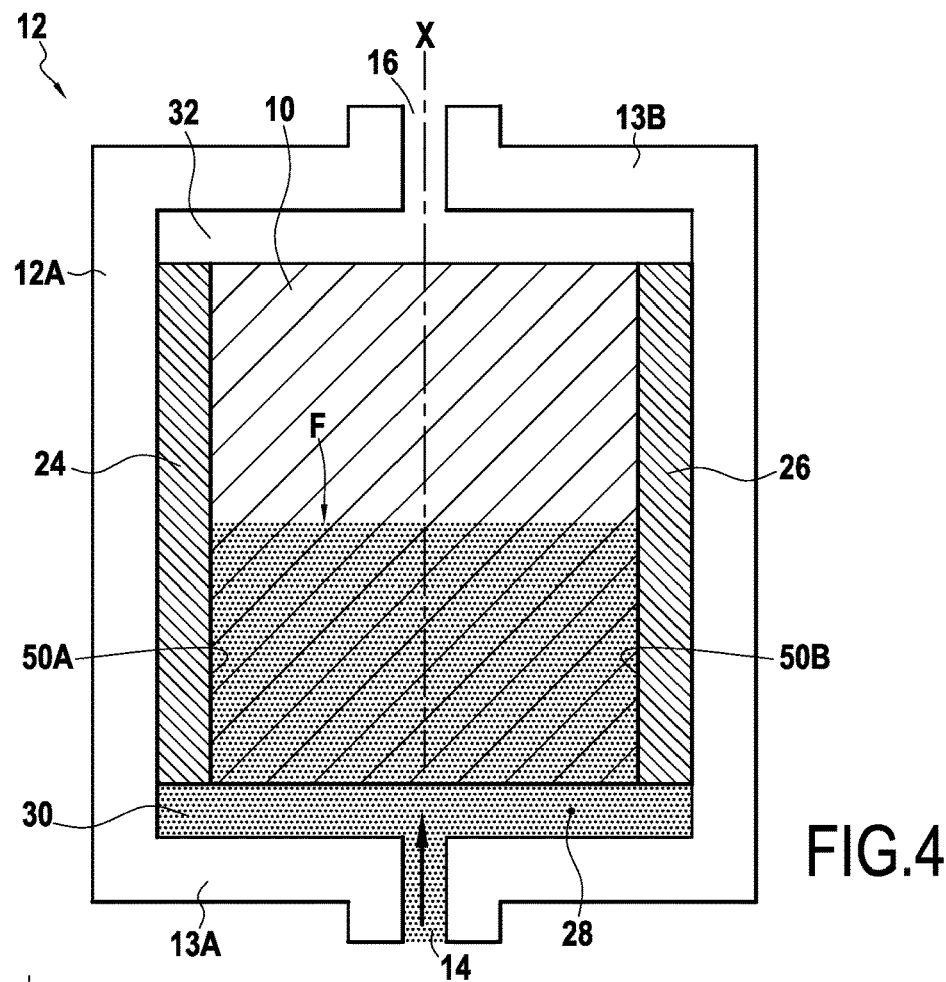
FIG. 4 shows a fourth step of the impregnation method in which the preform is impregnated.

FIG. 4 shows the FIG. 3A assembly during the step of impregnating the preform 10. In this example, impregnation is performed by injecting resin 28, however it is naturally possible to perform impregnation by infusion. Likewise in this example the impregnation material is a resin, but other materials such as a ceramic or a metal could equally well be envisaged. The material of the seal should therefore be selected accordingly.

As shown in FIG. 4, as a result of the seals 24 and 26 that have expanded and that have shut off the passages 20 and 22, the resin 28 is forced to pass through the fibrous preform 10, whereby the resulting injection front F is substantially plane. It should be observed in this example that a passage 30 perpendicular to the axial direction X is left upstream from the preform 10 between the preform 10 itself and the mold 12. This passage 30 forms an inlet manifold serving to diffuse the resin 28 uniformly within the preform 10. Likewise, a passage 32 perpendicular to the axial direction X is provided downstream from the preform 10 between the preform 10 itself and the mold 12. This passage 32 forms an outlet manifold enabling the resin 28 that has passed through the preform 10 to leave in uniform manner, thereby obtaining uniform diffusion and thus uniform impregnation of the resin 28 within the preform.

Figure 5:
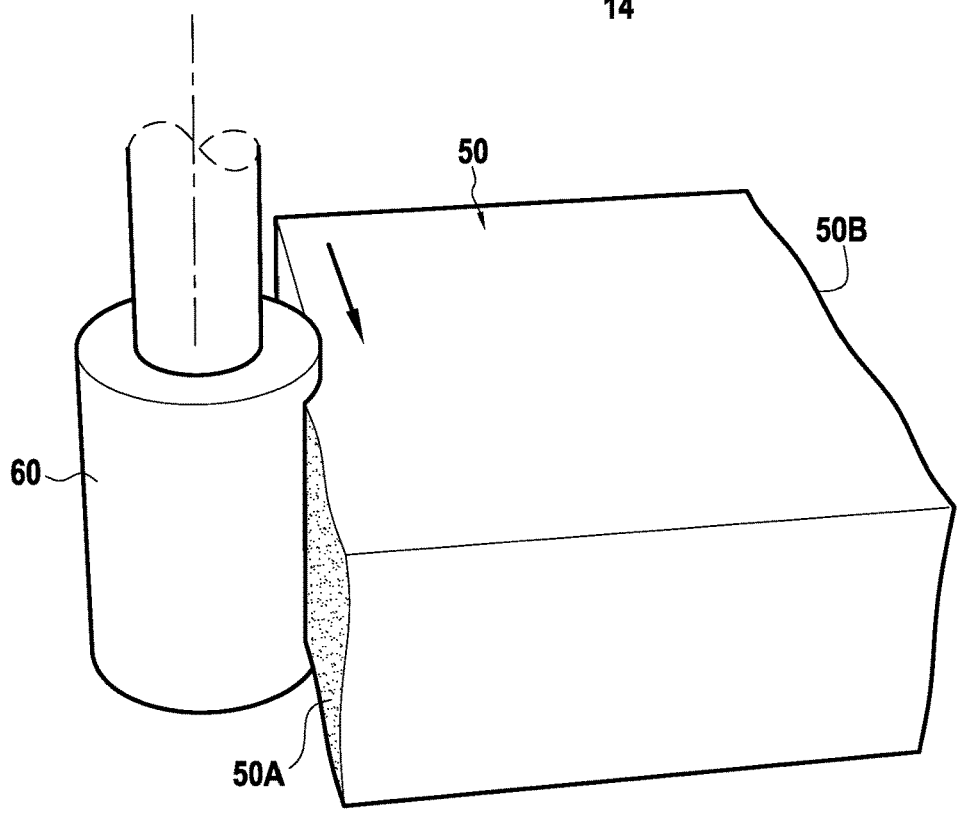
FIG. 5 shows a step of machining the raw matrix reinforced with the fibrous preform as obtained after the step shown in FIG. 4 at the end of the impregnation method.

At the end of the impregnation method as described with reference to FIGS. 1A to 4, a raw matrix 50 is obtained that is reinforced by a fibrous preform. This impregnation method forms the first step in a method for fabricating a matrix reinforced by a fibrous preform. A following step of the fabrication method comprises machining at least a portion of the raw preform in contact with a seal in the mold 12. FIG. 5 shows such a machining step. In this example, the machining is performed using a cutter 60 to mill an edge 50A of the reinforced raw matrix 50, which edge 50A is adjacent to the seal 24 in the mold 12. The edge 50B adjacent to the seal 26 in the mold 12 may also be milled. For clarity of description, although in the step shown in FIG. 4 the raw matrix 50 is not yet formed in full, the references 50A and 50B are nevertheless marked on the corresponding portions of the preform 10 while it is being impregnated.

In addition, with reference to FIGS. 3B and 3C, the machining shown in FIG. 5 may also aim to remove all or part of the sacrificial portions 10'A, 10'B, 10"A and/or 10"B.

Although the present invention is described with reference to specific embodiments, it is clear that modifications and changes may be undertaken on them without going beyond the general ambit of the invention as defined by the claims. In particular, individual characteristics of various embodiments shown and/or mentioned may be combined in additional embodiments. Consequently, the description and the drawings should be considered in a sense that is illustrative rather than restrictive.

It is also clear that all of the characteristics described with reference to a method are transposable, singly or in combination, to a device, and vice versa, all of the characteristics described with reference to a device are transposable, singly or in combination to a method.

The invention claimed is:

1. A method for impregnating a fibrous preform by injection or infusion, comprising the steps of:
   providing a mold having at least two portions, said mold presenting at least one inlet orifice and at least one vent orifice placed on opposite sides of the mold;
   placing a fibrous preform in a portion of the mold;
   placing at least one seal in at least one passage formed between an inside wall of the mold and the fibrous preform, said passage extending substantially along the direction extending between the opposite sides of the mold and respectively presenting the inlet orifice and the vent orifice, wherein the seal presents a cross-section consisting exclusively of a U-shape, and wherein the passage is a first passage and the at least one seal includes a first seal and a second seal;
   placing the second seal in a second passage extending substantially along the direction extending between the opposite sides of the mold;
   closing the mold so that the two portions of the mold co-operate with the seal in such a manner as to shut off said passage; and
   impregnating the fibrous preform with an impregnation material.

2. A method for impregnating a fibrous preform according to claim 1, wherein an edge of the fibrous preform is engaged in the cavity of the U-shape of the seal.

3. A method for impregnating a fibrous preform according to claim 1, wherein the seal is placed so that it extends in the mold over substantially the entire length of the fibrous preform between said opposite sides of the mold.

4. A method for impregnating a fibrous preform according to claim 1, wherein the impregnation material is a resin.

5. A method for fabricating a matrix reinforced by a fibrous preform, comprising the steps of:
   impregnating a fibrous preform in accordance with the method according to claim 1, thereby obtaining a reinforced raw matrix; and
   machining at least a portion of the reinforced raw matrix, the reinforced raw matrix having been in contact with the seal during impregnation.

* * * * *